(12) United States Patent
Wood et al.

(10) Patent No.: US 7,744,133 B2
(45) Date of Patent: Jun. 29, 2010

(54) JOINTED HEAD WITH TEMPORARY CLAMP FOR STIRLING MACHINE

(75) Inventors: James Gary Wood, Albany, OH (US); Joseph P. Carroll, Moorpark, CA (US)

(73) Assignee: Sunpower, Inc., Athens, OH (US)

( * ) Notice: Subject to any disclaimer, the term of this patent is extended or adjusted under 35 U.S.C. 154(b) by 728 days.

(21) Appl. No.: 11/711,379

(22) Filed: Feb. 27, 2007

(65) Prior Publication Data
US 2008/0203678 A1    Aug. 28, 2008

(51) Int. Cl.
*F16L 21/06* (2006.01)
*F16L 23/02* (2006.01)

(52) U.S. Cl. .................. 285/368; 285/364; 285/379

(58) Field of Classification Search .................. 285/337, 285/364, 368, 379, 406, 412
See application file for complete search history.

(56) References Cited

U.S. PATENT DOCUMENTS

| | | | | |
|---|---|---|---|---|
| 1,851,574 A * | 3/1932 | Fiederlein | ................ | 285/332 |
| 2,157,885 A * | 5/1939 | Bailey | ................ | 285/288.1 |
| 2,201,862 A * | 5/1940 | Heisterkamp | ................ | 285/55 |
| 2,691,539 A * | 10/1954 | Milam | ................ | 285/233 |
| 3,776,579 A * | 12/1973 | Gale | ................ | 285/233 |
| 4,008,937 A * | 2/1977 | Filippi | ................ | 439/192 |
| 4,252,349 A * | 2/1981 | Mahoff | ................ | 285/238 |
| 4,288,105 A * | 9/1981 | Press | ................ | 285/55 |
| 4,695,079 A * | 9/1987 | Weinhold | ................ | 285/278 |
| 5,188,400 A * | 2/1993 | Riley et al. | ................ | 285/233 |
| 5,383,691 A * | 1/1995 | Anthony | ................ | 285/325 |
| 6,375,228 B1 * | 4/2002 | Klemm et al. | ................ | 285/47 |
| 6,880,859 B2 * | 4/2005 | Breay et al. | ................ | 285/1 |
| 7,144,047 B2 * | 12/2006 | Dole | ................ | 285/233 |
| 2005/0127666 A1 * | 6/2005 | Dole | ................ | 285/233 |
| 2006/0012174 A1 * | 1/2006 | Garton et al. | ................ | 285/412 |
| 2006/0284420 A1 * | 12/2006 | Dole | ................ | 285/367 |
| 2007/0024055 A1 * | 2/2007 | Kraft | ................ | 285/368 |
| 2007/0102926 A1 * | 5/2007 | Magnier et al. | ................ | 285/368 |
| 2008/0054634 A1 * | 3/2008 | Dole | ................ | 285/337 |
| 2008/0174113 A1 * | 7/2008 | Brimson | ................ | 285/368 |

* cited by examiner

*Primary Examiner*—James M Hewitt
(74) *Attorney, Agent, or Firm*—Frank H. Foster; Kremblas & Foster

(57) ABSTRACT

A clamping apparatus for allowing pre-close-out access to the head of a Stirling machine and facilitating subsequent close-out welding of the head. The head is axially separable into removable and fixed portions that engage each other. Each portion has an annular flange extending radially outwardly at its engaging end, and each flange has an annular groove. O-rings are seated in the grooves. A temporary sealing ring surrounds and engages the O-rings. Clamping rings seat against axially opposite sides of the abutting annular flanges. Fasteners draw the rings together, thereby drawing the fixed and removable portions of the head together and securing them against relative axial movement. For close-out of the machine, the clamping rings, temporary sealing ring, and O-rings are removed and the grooved annular flanges serve as weld reliefs for final hermetic close-out welding.

13 Claims, 3 Drawing Sheets

JOINTED HEAD WITH TEMPORARY CLAMP FOR STIRLING MACHINE

STATEMENT REGARDING FEDERALLY-SPONSORED RESEARCH AND DEVELOPMENT

This invention was made with Government support under contract NAS3-03128 awarded by NASA. The Government has certain rights in the invention.

CROSS-REFERENCES TO RELATED APPLICATIONS (Not Applicable)

REFERENCE TO AN APPENDIX (Not Applicable)

BACKGROUND OF THE INVENTION

1. Field of the Invention

This invention relates generally to the field of free-piston Stirling machines and, more particularly, to a head structure and cooperating clamping assembly for allowing access to the thermal regenerator packing in the head of a Stirling machine between tests of the machine and also facilitating final, close-out welding for hermetically sealing the machine after testing is concluded.

2. Description of the Related Art

Stirling machines have been known for nearly two centuries but in recent decades have been the subject of considerable development because of advantages they offer. In a Stirling machine, a working gas is confined in a working space comprised of an expansion space and a compression space. The working gas is alternately expanded and compressed in order to either do work or to pump heat. Stirling machines cyclically shuttle a working gas between the compression space and the expansion space which are connected in fluid communication through a heat accepter, regenerator and heat rejecter. The shuttling is commonly done by pistons reciprocating in cylinders and cyclically changes the relative proportion of working gas in each space. Gas that is in the expansion space, and/or gas that is flowing into the expansion space through a heat exchanger (the accepter) between the regenerator and the expansion space, accepts heat from surrounding surfaces. Gas that is in the compression space, and/or gas that is flowing into the compression space through a heat exchanger (the rejecter) between the regenerator and the compression space, rejects heat to surrounding surfaces. The gas pressure is essentially the same in both spaces at any instant of time because the spaces are interconnected through a path having a relatively low flow resistance. However, the pressure of the working gas in the work space as a whole varies cyclically and periodically. When most of the working gas is in the compression space, heat is rejected from the gas. When most of the working gas is in the expansion space, the gas accepts heat. This is true whether the machine is working as a heat pump or as an engine. The only requirement to differentiate between work produced or heat pumped, is the temperature at which the expansion process is carried out. If this expansion process temperature is higher than the temperature of the compression space, then the machine is inclined to produce work and if this expansion process temperature is lower than the compression space temperature, then the machine will pump heat from a cold source to a warm sink.

Stirling machines can therefore be designed to use the above principles to provide either (1) an engine having pistons driven by applying an external source of heat energy to the expansion space and transferring heat away from the compression space, or (2) a heat pump having pistons cyclically driven by a prime mover for pumping heat from the expansion space to the compression space. The heat pump mode permits Stirling machines to be used for cooling an object in thermal connection to its expansion space, including to cryogenic temperatures, or heating an object, such as a home heating heat exchanger, in thermal connection to its compression space. Therefore, the term Stirling "machine" is used to generically include both Stirling engines and Stirling heat pumps.

Until about 1965, Stirling machines were constructed as kinematically driven machines meaning that the pistons are connected to each other by a mechanical linkage, typically connecting rods and crankshafts. The free piston Stirling machine was then invented by William Beale. In the free piston Stirling machine, the pistons are not connected to a mechanical drive linkage. Free-piston Stirling machines are constructed as mechanical oscillators and one of its pistons, conventionally identified as a displacer, is driven by the working gas pressure variations in the machine. The other piston, conventionally identified as the power piston, is either driven by a reciprocating prime mover when the Stirling machine is operated in its heat pumping mode or drives a reciprocating mechanical load when the Stirling machine is operated as an engine. Free piston Stirling machines offer numerous advantages including the control of their frequency and phase and their lack of a requirement for a seal between moving parts to prevent the mixing of working gas and lubricating oil.

As known to persons skilled in the Stirling art, the regenerator of a Stirling machine consists of a porous, heat energy storage medium, typically a metal, with interconnected interstices that form a tortuous path through which the working gas flows in alternately opposite directions between the expansion space and the compression space. As the working gas flows through the regenerator, thermal energy is transferred between the regenerator medium and the working gas. A regenerator greatly improves the efficiency of a Stirling machine. Modern regenerator materials include fine porous metal wires or particles and non-woven, metal wire agglomerations.

The design and construction process for fabricating a Stirling machine so it operates according to particular operating criteria commonly requires multiple, sequential replications of the steps of extensive testing followed by modification of the design followed by testing of the modified design. The characteristics of the regenerator material that is packed in the regenerator cavity formed in the head of the Stirling machine have a substantial effect upon the operating characteristics of the Stirling machine. The regenerator material characteristics include the chemical composition of the material, the physical shape or morphology of the material, the density of the material and the size and shape of the passages through the material. Therefore, during the repeated design and testing phase, it is desirable to have convenient access to the internal regenerator packing material prior to final hermetic close-out of the machine. The convenience of acquiring access to the regenerator cavity so that the regenerator packing may be replaced or adjusted and the convenience of reassembly and hermetic sealing for further testing contribute to reducing the time, labor and cost of the design and testing phase.

After the design and testing phase is completed, the machine is then permanently hermetically sealed by performing a final close-out weld on the head of the machine which is desirably accomplished without disturbing the regenerator material.

It is therefore an object and feature of the invention to provide a head structure and associated clamping structure to provide a clamping apparatus that allows convenient temporary access to the regenerator packing of a Stirling machine, that allows the head to be conveniently resealed for further testing and that allows subsequent convenient access for further modification of the regenerator packing.

A further object and feature of the invention is to not only allow the previously described repetitions of regenerator packing modification followed by testing but additionally provides a structure on the head of the Stirling machine that facilitates final close-out welding of the machine's head without disturbing or damaging the regenerator cavity or the regenerator packing material in the cavity.

BRIEF SUMMARY OF THE INVENTION

The present invention is directed to a structure for temporarily clamping together two axially separable component portions of the head of a Stirling machine while also facilitating final close-out welding of the head. The head is axially separable into two portions with the point of separation located adjacent to the thermal regenerator packing of the machine and preferably near the cold end. Each of the separable portions has an annular flange extending radially outwardly from a point at or near the end at which it engages the other separable portion. Each flange has an outwardly opening, concentric annular groove, and each groove has an O-ring seated in it. A temporary sealing ring is fitted over the O-rings so that it surrounds and sealingly engages both O-rings. Two clamping rings, each having annular, axially facing end surfaces along the inner circumferential edge of one of its axially opposite sides, are seated on the head such that each end surface axially engages a flange. Each clamping ring preferably has a plurality of holes annularly spaced about the ring and each hole in one ring is axially aligned with a hole in the other ring. Removable fasteners engage each of the holes for drawing the clamping rings together when tightened, thereby drawing together the flanges and with them the two portions of the head and securing them against relative axial movement. Preferably, the clamping rings have shoulders, each shoulder having a radially inwardly facing surface engaging the removable sealing ring to also secure the sealing ring in place in sealing relationship against the O-rings.

When the machine is ready for final close-out welding, the clamping rings, temporary sealing ring, and O-rings are removed, and the grooved annular flanges are welded together with the grooves serving as weld reliefs for final hermetic close-out welding of the head.

Figure 1:
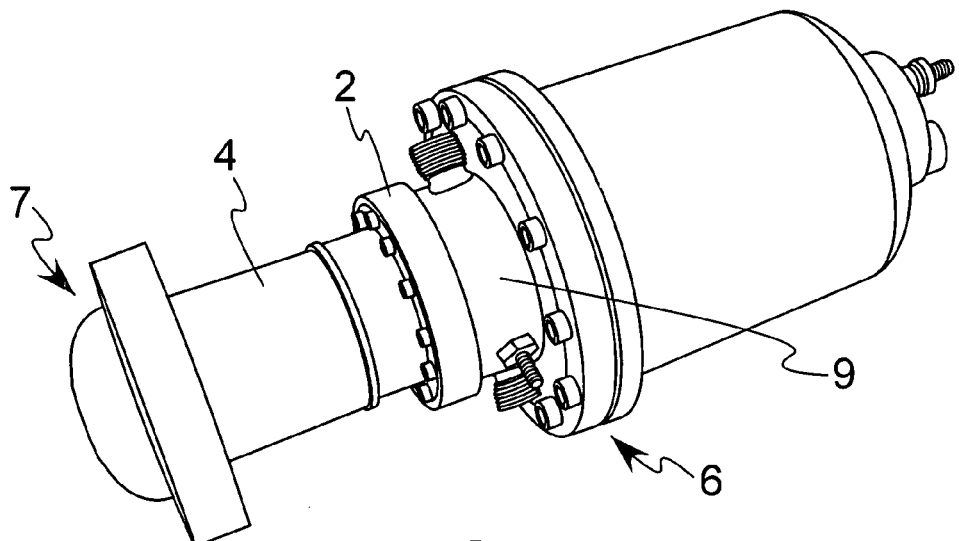
FIG. 1 is view in perspective of the preferred embodiment of the invention on a typical Stirling machine.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
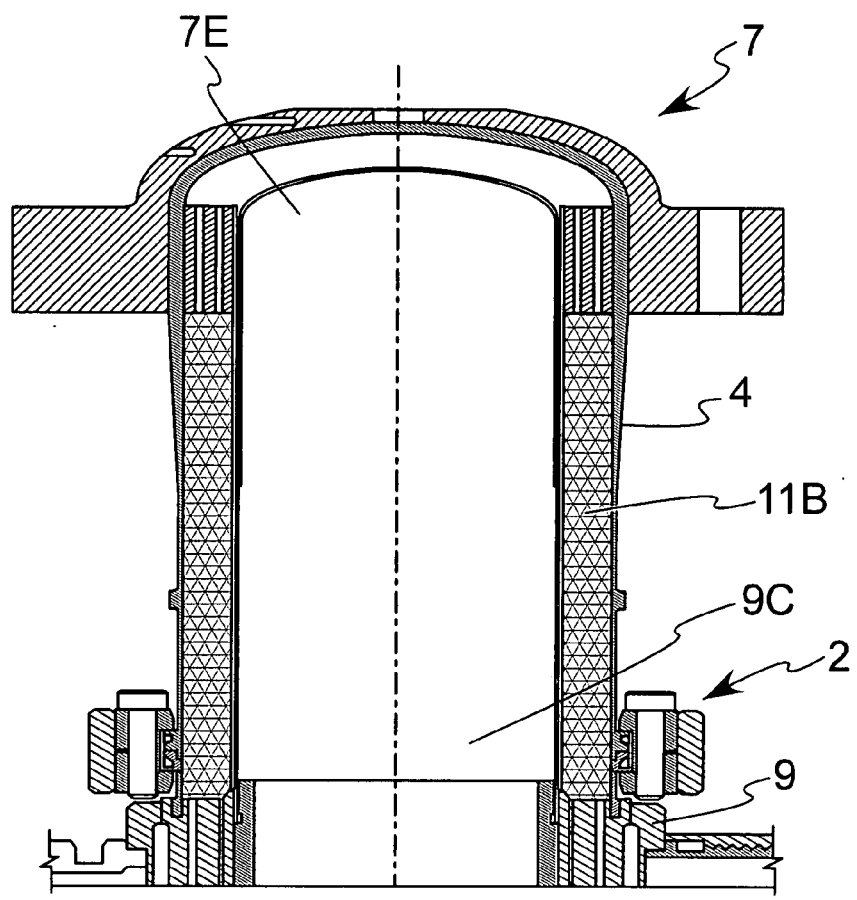
FIG. 2 is a view in axial section of the head portion of the embodiment illustrated in FIG. 1.

With reference to FIGS. 1 and 2, the clamping apparatus 2 of the present invention is mounted on the head 4 of a Stirling machine 6 at a point adjacent to the machine's thermal regenerator packing 11B. The regenerator packing 11B (concealed in FIG. 1) is confined in a chamber formed within the head 4 and interposed between the hot end heat exchanger 7 surrounding the expansion space 7E and the cold end heat exchanger 9 surrounding the compression space 9C.

Figure 3:
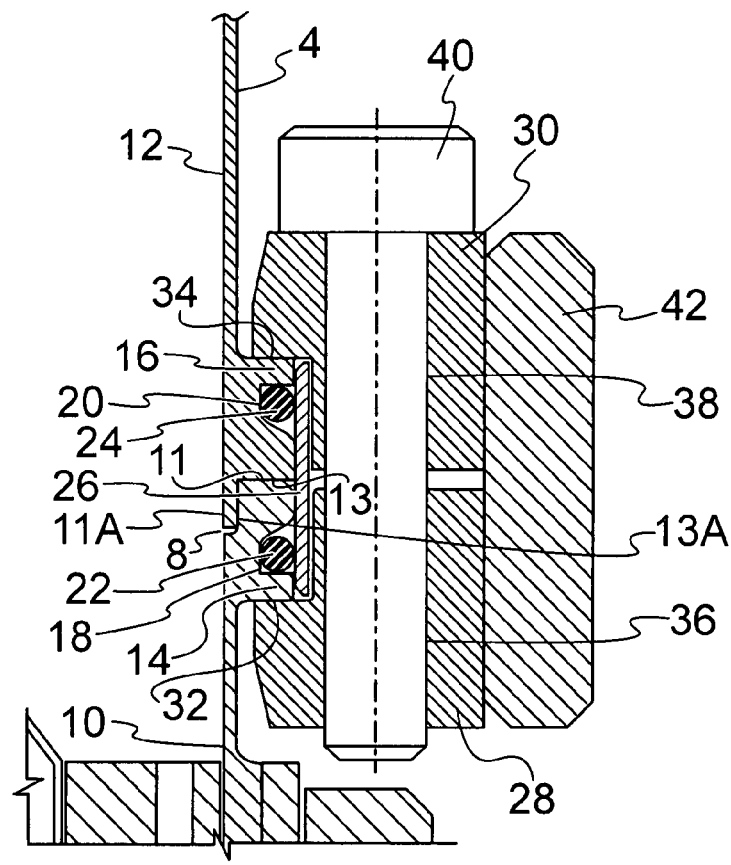
FIG. 3 is a view in partial axial section illustrating the details of the embodiment illustrated in FIG. 1.
Figure 4:
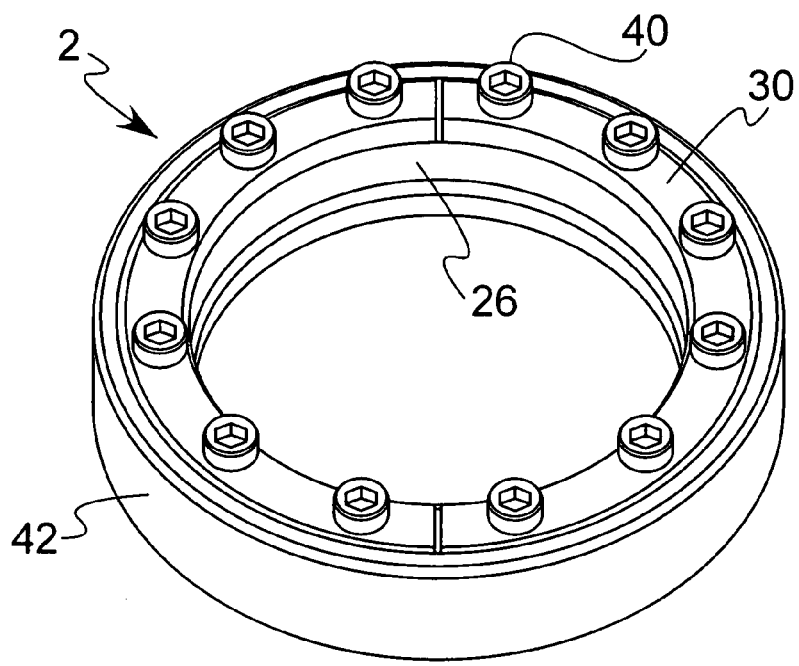
FIG. 4 is a view in perspective of the assembled clamping rings, the sealing ring, the retaining ring, and the removable fasteners of the preferred embodiment illustrated in FIG. 1.

Referring to FIGS. 3 and 4, the Stirling machine head 4 is axially separable at point 8 into a fixed portion 10 and a removable portion 12. Each portion axially engages the other at their engaging ends 11, 13, preferably with an alignment shoulder 13A and an overlapping alignment lip 11A extending into the alignment shoulder 13A as depicted. The matingly engaging lip 11A and shoulder 13A serve to guide the engaging ends 11, 13 of the head portions 10, 12 into radial alignment when the fixed portion 10 and the removable portion 12 of the head 4 are assembled. They also provides a weld backup to protect the regenerator packing material 11B from being melted or distorted by the heat of a weld. Both head portions 10, 12 have annular flanges 14, 16 extending radially outwardly from substantially their engaging ends 11, 13. The flanges 14, 16 have concentric, annular grooves 18, 20 formed in their outer surfaces and opening radially outwardly. Sealing O-rings 22, 24 are seated in the annular grooves.

Figure 5:
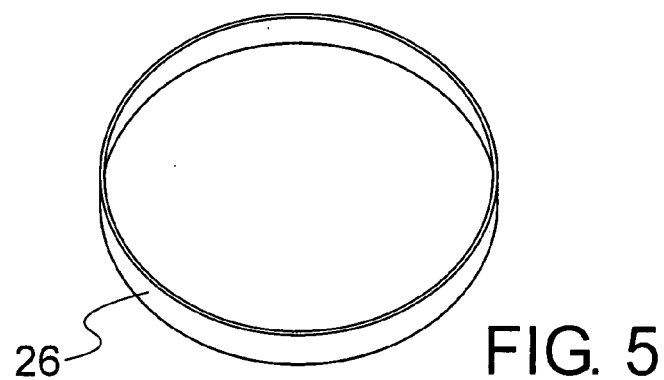
FIG. 5 is a view in perspective of the temporary sealing ring of the embodiment illustrated in FIG. 1.

A temporary sealing ring 26 surrounds and sealingly engages the O-rings 22, 24 and, by bridging the O-rings, provides a gas tight seal between the separable head portions 10, 12. The sealing ring 26 is illustrated in more detail in FIG. 5.

Each of a pair of clamping rings 28, 30 has an annular shoulder 32, 34 along its inwardly-facing inner circumferential edge. The radially, inwardly facing surfaces of the shoulders 32, 34 are not essential but are preferred for allowing more compact axial assembly. Preferably, the radially, inwardly facing surfaces of the shoulders 32, 34 both engage the outer peripheral surface of the temporary sealing ring 26 to retain the sealing ring 26 against outward expansion in order to prevent gas leakage. However, the radially, inwardly facing surfaces and therefore the shoulders are not necessary because the sealing ring, if made sufficiently thick, can withstand the internal pressure of the Stirling machine and itself maintain the seal of the O-rings and prevent leakage without the added support. The annular, axially facing end surfaces of the shoulders 32, 34 of the clamping rings 28, 30 engage the axially opposite ends of the flanges 14, 16 in order to allow the clamping rings 28, to clamp together the flanges, and therefore the fixed portion 10 and the removable portion 12 of the head 4. The same axially facing end surfaces of the shoulders 32, 34 are spaced closely to or engage the axially opposite edges of the sealing ring 26 to prevent the sealing ring 26 from sliding axially. As will be seen, the axial length of the sealing ring 26 can be no longer than the sum of the axial lengths of the two flanges 14, 16 when the flanges are clamped together. Preferably, the axial length of the sealing ring 26 is slightly less than the sum of the axial lengths of the two flanges 14, 16 to their axially facing end surfaces in order to assure that the sealing ring 26 will not be engaged by both axially facing end surfaces of the shoulders 32, 34 of the clamping rings 28, 30 before the clamping rings 28, 30 can clamp the flanges 14, 16 together in the manner to be described. Although not preferred, the shoulders 32, 34 of the clamping rings can be omitted and instead the clamping rings can have simple axially facing end surfaces for engaging and clamping together the flanges 14, 16.

The clamping rings 28, 30 additionally each have a plurality of holes 36, 38 spaced annularly around the rings. When the clamping rings 28, 30 are seated on the head 4, the holes of one clamping ring are axially aligned with the holes of the other. Removable fasteners 40, such as bolts, engage each pair of opposing holes thereby allowing the clamping rings 28, 30 to be drawn together when the fasteners 40 are tightened. The holes 36, 38 of one of the clamping rings 28, 30 can be formed with female threads for engaging male threads on a bolt or, alternatively, a nut may be used in the conventional manner with a bolt to draw the clamping rings 28, 30 together. In this arrangement, the clamping rings 28, 30 exert opposite, axial forces on the flanges 14, 16 securing the fixed 10 and removable 12 portions of the head 4 against relative axial movement.

Figures 6, 7:
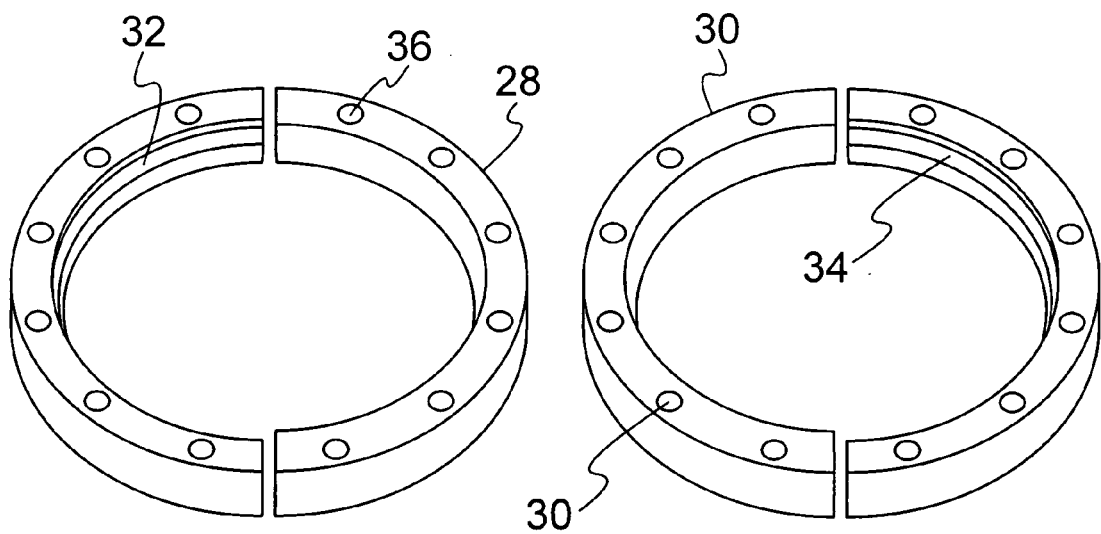
FIG. 6 is a view in perspective of one of the segmented clamping rings showing one segment inverted from its operable position when assembled.
FIG. 7 is a view in perspective of the other, and identical, segmented clamping ring showing one segment inverted from its operable position when assembled.
Figure 8:
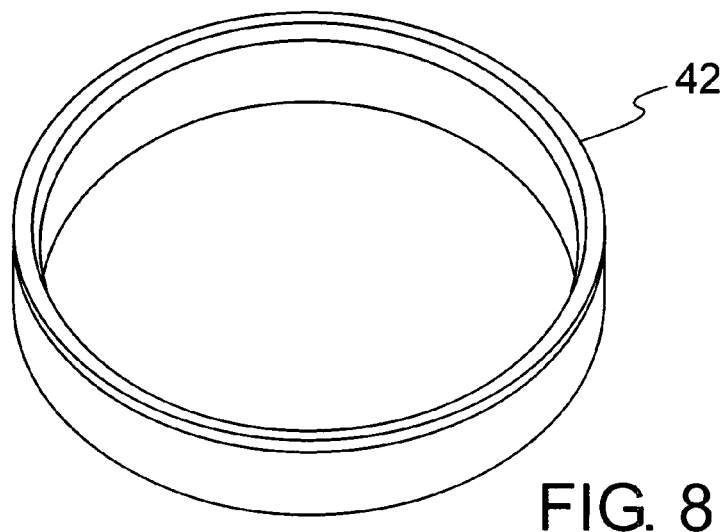
FIG. 8 is a view in perspective of the retaining ring of the embodiment illustrated in FIG. 1.

Referring to FIG. 6, one or both clamping rings 28, 30 are preferably split into two or more component segments allowing for the segments to be mounted and removed from the head 4 radially, thereby obviating the difficulties that would be associated with mounting and removing a one-piece ring. For example, if the clamping rings were each a single piece ring they would require mounting on the head, on axially opposite side of the flanges, prior to fabrication of the Stirling machine. It would also be necessary to cut a one-piece ring in order to remove it from the head 4 thereby risking damage to the head. A one-piece ring also could not be replaced because the ends of the head ordinarily have structures fixed to them that are larger than the inside diameter of the clamping rings.

In order to avoid points of cumulative weakness at positions around the circumferences of segmented clamping rings 28, 30, the rings should be mounted with the segment ends of one ring circumferentially offset from the segment ends of the other ring. In the preferred embodiment, the clamping rings 28, 30 are each split into two component segments, with the segment ends of one ring circumferentially offset from the segment ends of the other ring by ninety degrees. The rings could be divided into 3 or more segments but that is unnecessary.

Referring again to FIGS. 3 and 4, a retainer, such as a retaining ring 42, may additionally be employed to surround and engage the outer periphery of the segmented clamping rings 28, 30. Preferably, the retaining ring 42 has an inner diameter so that it provide an interference or frictional fit with the outer periphery of the clamping rings 28, 30 for securing the segments of the clamping rings 28, 30 against outward, radial movement.

As a typical example, the preferred material for constructing embodiments of the invention is high strength steel or stainless steel. The radial thickness of the sealing ring 26 is approximately the same thickness as the radial thickness of the sidewalls of cylindrical Stirling machine head 4, known to those skilled in the art. For sufficient strength, the cross-sectional area of the clamping rings 30 and 36 is typically several times that of the head flanges 14, 16 because the bending moment is larger due to the larger distance from the head-flange midpoint of contact to the bolt circle, compared to the distance from the midpoint of contact to the inner diameter of the head. The axial forces are about the same at these points, but the distance between contact is larger. Because the preferred split clamping rings are weaker than unsegmented clamping rings, the split clamping rings 28, 30 have about 10 times the cross sectional area of the head flanges 14, 16.

The use and operation of embodiments of the invention begin with the manufacture of the Stirling machine. The head is manufactured in the two separable portions having the flanges at their engaging ends. An O-ring is seated in each annular groove and the retaining ring 42 is slid axially past one of the flanges so it surrounds one of the separable head portions and awaits later assembly. The sealing ring 26 is slid around and onto the flange of one of the separable head portions with an interposed O-ring. The flange of the other separable head portion is inserted in the sealing ring 26 and the ends of the head portions are pushed together. The clamping ring segments are then positioned on axially opposite sides of the abutting flanges and the bolts are screwed into position to draw the sealing rings toward each other and clamp the flanges together. The retaining ring is then slid axially and forced around the outer periphery of the clamping rings.

After assembly of the clamping apparatus, the Stirling machine is charged with a working gas and tested. After testing, the Stirling machine can be depressurized to atmospheric pressure and the above assembly procedure reversed to disassemble the clamping apparatus and allow access to the regenerator packing 11B. This access allows the regenerator packing material to be replaced, adjusted or supplemented with additional packing material. Thereafter, the above assembly procedure may be followed and the Stirling machine tested with the modified regenerator packing 11. These steps may be repeated until the designer is satisfied that the regenerator packing is optimized or operates satisfactorily.

Once the testing phase of the machine is complete and final close-out of the head is desired, after depressurization the retaining ring 42, clamping rings 28, 30, temporary sealing ring 26, and O-rings 22, 24 are removed while the removable head portion 12 is held against the fixed head portion 10 by an external clamp means (such as mounting the Stirling machine in a lathe) to avoid disturbing the regenerator packing material or anything else in the machine's interior. Removal of the removable components of the clamping apparatus is accomplished by cutting the retaining ring 42, removing the fasteners 40 and the clamping rings 28, 30, cutting the temporary sealing ring 26, and cutting the O-rings 22, 24. Importantly, all these parts may be removed without separating the head portions and therefore without disturbing the regenerator packing 11. The two portions 10, 12 of the head may then be permanently hermetically sealed together by welding the annular flanges 14, 16 together at their abutting ends and around their outer periphery. The grooves in annular flanges serve as weld reliefs that reduce heat flow away from the weld joint during the welding operation.

While certain preferred embodiments of the present invention have been disclosed in detail, it is to be understood that various modifications may be adopted without departing from the spirit of the invention or scope of the following claims.

The invention claimed is:

1. A clamping apparatus for allowing pre-close-out access to, and facilitating the permanent sealing of, the regenerator packing of a Stirling machine having a head axially separable into a removable portion and a fixed portion, each portion having an end that engages the other, the apparatus comprising:
   (a) an annular flange extending radially outwardly from substantially each engaging end, each flange having a concentric outwardly opening annular groove;
   (b) O-rings removably seated in the grooves of the annular flanges;
   (c) a removable sealing ring surrounding and sealingly engaging the O-rings;
   (d) two clamping rings, each ring having an annular, axially facing end surface along the circumferential edge of one of its axially opposite sides, each ring surrounding the head, with the annular end surfaces engaging the annular flanges; and
   (e) fasteners engaging the clamping rings for clamping the annular flanges together between the clamping rings.

2. A clamping apparatus in accordance with claim 1, wherein the clamping rings additionally have a plurality of holes spaced annularly about each clamping ring, each hole aligned along an axis parallel to the axis of the clamping ring and axially aligned with an opposing hole on the other clamping ring, and a plurality of fasteners extending through each pair of opposing holes for drawing the clamping rings together.

3. A clamping apparatus in accordance with claim 1, wherein the clamping apparatus additionally comprises a retainer engaging the clamping rings for securing the clamping rings against outward radial movement.

4. A clamping apparatus in accordance with claim 1, wherein each clamping ring has an annular shoulder along said inner circumferential edge of one of its axially opposite sides, one surface of the annular shoulder being said annular, axially facing end surface and the other surface of said annular shoulder being a radially inwardly facing surface.

5. A clamping apparatus in accordance with claim 1, wherein the engaging end of one head portion has an alignment shoulder and the engaging end of the other head portion has an overlapping alignment lip extending into the shoulder.

6. A clamping apparatus in accordance with claim 1, wherein at least one clamping ring comprises two or more component segments.

7. A clamping apparatus in accordance with claim 6, wherein both clamping rings comprise two or more component segments.

8. A clamping apparatus in accordance with claim 7, wherein each clamping ring has an annular shoulder along said circumferential edge of one of its axially opposite sides, one surface of the annular shoulder being said annular, axially facing end surface and the other surface of said annular shoulder being a radially inwardly facing surface.

9. A clamping apparatus in accordance with claim 8, wherein the clamping apparatus additionally comprises a retainer engaging the clamping rings for removably securing the component segments of the rings against radial movement.

10. A clamping apparatus in accordance with claim 9, wherein the retainer comprises an annular retaining ring surrounding and engaging the clamping rings.

11. A clamping apparatus in accordance with claim 10, wherein the clamping rings additionally comprise a plurality of holes spaced annularly about each clamping ring, each hole aligned along an axis parallel to the axis of the clamping ring and axially aligned with an opposing hole on the other clamping ring, and a plurality of fasteners extending through each pair of opposing holes for drawing the clamping rings together.

12. A clamping apparatus in accordance with claim 11, wherein the clamping rings are removably seated concentrically around the head and have an inner diameter substantially equal to the outer diameter of the head.

13. A clamping apparatus in accordance with claim 12, wherein the engaging end of one head portion has an alignment shoulder and the engaging end of the other head portion has an overlapping alignment lip extending into the shoulder.

* * * * *

UNITED STATES PATENT AND TRADEMARK OFFICE
CERTIFICATE OF CORRECTION

| | | |
|---|---|---|
| PATENT NO. | : 7,744,133 B2 | Page 1 of 1 |
| APPLICATION NO. | : 11/711379 | |
| DATED | : June 29, 2010 | |
| INVENTOR(S) | : James Gary Wood et al. | |

It is certified that error appears in the above-identified patent and that said Letters Patent is hereby corrected as shown below:

Column 7, Claim 1, line 14, after O-rings and before the ";" insert:
--the sealing ring having an axial length equal to or less than the sum of the axial lengths of the flanges--

Signed and Sealed this
Thirtieth Day of August, 2011

David J. Kappos
*Director of the United States Patent and Trademark Office*